United States Patent
Kaburagi et al.

(10) Patent No.: US 9,331,334 B2
(45) Date of Patent: *May 3, 2016

(54) SOLID SOLUTION LITHIUM-CONTAINING TRANSITION METAL OXIDE AND LITHIUM ION SECONDARY BATTERY

(71) Applicant: NISSAN MOTOR CO., LTD., Kanagawa (JP)

(72) Inventors: Tomohiro Kaburagi, Yokohama (JP); Yasuhiko Osawa, Yokosuka (JP); Atsushi Ito, Ebina (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/375,248

(22) PCT Filed: Jan. 31, 2013

(86) PCT No.: PCT/JP2013/052195
§ 371 (c)(1),
(2) Date: Jul. 29, 2014

(87) PCT Pub. No.: WO2013/115314
PCT Pub. Date: Aug. 8, 2013

(65) Prior Publication Data
US 2015/0014583 A1 Jan. 15, 2015

(30) Foreign Application Priority Data
Feb. 3, 2012 (JP) .................... 2012-022002

(51) Int. Cl.
*H01M 4/525* (2010.01)
*H01M 4/505* (2010.01)
(Continued)

(52) U.S. Cl.
CPC ............. *H01M 4/485* (2013.01); *C01G 53/006* (2013.01); *C01G 53/56* (2013.01); *H01M 4/505* (2013.01);
(Continued)

(58) Field of Classification Search
CPC ..... H01M 4/525; H01M 4/505; H01M 4/485; C01G 53/00
USPC ........... 252/182.1, 184, 519.15; 429/188, 223
See application file for complete search history.

(56) References Cited

U.S. PATENT DOCUMENTS

2007/0020520 A1* 1/2007 Ugaji .................. H01M 4/0495
429/218.1
2008/0280205 A1 11/2008 Jiang et al.
(Continued)

FOREIGN PATENT DOCUMENTS

CN 101030639 A 9/2007
EP 2685533 A1 1/2014
(Continued)

OTHER PUBLICATIONS

Gan et al. "Origin of the irreversible plateau (4.5V) of Li[Li0.182Ni0.182Co0.092Mn0.545]O2 layered material". Oct. 21, 2005. Science Direct. Electrochemistry Communications 7 (2005) 1318-1322. Total pp. 5.*

*Primary Examiner* — Mark Kopec
*Assistant Examiner* — Danny N Kang
(74) *Attorney, Agent, or Firm* — Young Basile Hanlon & MacFarlane P.C.

(57) ABSTRACT

A solid solution lithium-containing transition metal oxide includes a compound represented by chemical formula (1): $Li_{1.5}[Ni_aCo_bMn_c[Li]_d]O_3$, where a, b, c and d satisfy relationships: $0.39 \leq a < 0.75$, $0 \leq b \leq 0.18$, $0 < c < 1.00$, $0.05 \leq d \leq 0.25$, and $a+b+c+d=1.5$. The use of the solid solution lithium-containing transition metal oxide in a lithium ion secondary battery can contribute to decreasing the amount of hysteresis of the battery, achieving high energy efficiency, and ensuring a high discharge capacity.

8 Claims, 4 Drawing Sheets

(51) Int. Cl.
*H01M 4/485* (2010.01)
*C01G 53/00* (2006.01)
*H01M 10/0525* (2010.01)

(52) U.S. Cl.
CPC ........... *H01M 4/525* (2013.01); *C01P 2006/80* (2013.01); *H01M 10/0525* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2010/0112448 A1 | 5/2010 | Yu et al. |
| 2010/0227222 A1* | 9/2010 | Chang .................... C01D 15/00 429/231.95 |
| 2010/0233542 A1 | 9/2010 | Endo et al. |
| 2011/0037440 A1 | 2/2011 | Endo et al. |
| 2012/0045690 A1* | 2/2012 | Xiang et al. .................. 429/211 |
| 2013/0330616 A1* | 12/2013 | Christensen .................. 429/211 |

FOREIGN PATENT DOCUMENTS

| | | | |
|---|---|---|---|
| EP | 2824736 A1 | | 1/2015 |
| JP | 2007-220630 A | | 8/2007 |
| JP | 2008-270201 A | | 11/2008 |
| JP | 2009-152114 A | | 7/2009 |
| JP | 2009-259505 A | | 11/2009 |
| JP | 2011-028999 A | | 2/2011 |
| JP | 2011028999 A | * | 2/2011 |
| TW | 200905955 A | | 2/2009 |

\* cited by examiner

SOLID SOLUTION LITHIUM-CONTAINING TRANSITION METAL OXIDE AND LITHIUM ION SECONDARY BATTERY

CROSS REFERENCE TO RELATED APPLICATION

The present application claims priority to Japanese Patent Application No. 2012-022002, filed Feb. 3, 2012 and incorporated herein in its entirety.

TECHNICAL FIELD

The present invention relates to a solid solution lithium-containing transition metal oxide. The present invention also relates to a lithium ion secondary battery using the solid solution lithium-containing transition metal oxide.

BACKGROUND

In recent years, reduction of emissions of carbon dioxide is strongly desired in order to cope with air pollution and global warming. In the automobile industry, the reduction of emissions of carbon dioxide is highly expected in association with the spread of electric vehicles (EV) and hybrid electric vehicles (HEV). Therefore, development of secondary batteries for driving motors as a key to practical application of such vehicles, is actively being carried out.

As for the secondary batteries for driving motors, lithium ion secondary batteries having high theoretical energy are gaining increasing attention and are therefore being developed rapidly. In general, a lithium ion secondary battery has a configuration in which several sets of a positive electrode, a negative electrode and an electrolyte layer interposed between these electrodes, are housed in a battery case. The positive electrode is obtained in a manner such that positive electrode slurry containing a positive electrode active material is applied to a surface of a current collector. The negative electrode is obtained in a manner such that negative electrode slurry containing a negative electrode active material is applied to a surface of a negative electrode current collector.

In order to improve capacity characteristics and output performance of the lithium ion secondary battery, it is quite important to determine the respective active materials of the lithium ion secondary battery.

There is known a battery using a positive electrode active material containing a lithium composite oxide represented by the chemical formula: $Li_{1+a}[Mn_bCo_cNi_{(1-b-c)}]_{(1-a)}O_{(2-d)}$, as proposed in Japanese Patent Unexamined Publication No. 2007-220630. In the chemical formula, a, b, c and d respectively satisfy the conditions: $0<a<0.25$, $0.5\leq b<0.7$, $0\leq c<(1-b)$ and $-0.1\leq d\leq 0.2$.

SUMMARY

However, the lithium ion secondary battery using the positive electrode active material described in Japanese Patent Unexamined Publication No. 2007-220630 has a problem of causing hysteresis. The hysteresis is a phenomenon in which an open circuit voltage (OCV) curve during charge greatly differs from an open circuit voltage curve during discharge. When the amount of hysteresis showing the difference level is large, the energy efficiency tends to decrease.

The present invention has been made in consideration of such a conventional problem. It is an object of the present invention to provide a solid solution lithium-containing transition metal oxide having a small amount of hysteresis and a high discharge capacity and to provide a lithium ion secondary battery using this oxide.

A solid solution lithium-containing transition metal oxide according to an aspect of the present invention includes a compound represented by chemical formula (1):

wherein a, b, c and d satisfy relationships: $0.39 \leq a < 0.75$, $0 \leq b \leq 0.18$, $0 < c < 1.00$, $0.05 \leq d \leq 0.25$, and $a+b+c+d=1.5$.

A lithium ion secondary battery according to another aspect of the present invention includes the solid solution lithium-containing transition metal oxide according to the aspect described above.

DESCRIPTION OF EMBODIMENTS

Hereinafter, a solid solution lithium-containing transition metal oxide and a lithium ion secondary battery according to an embodiment will be explained in detail.

[Solid Solution Lithium-containing Transition Metal Oxide]

First, a solid solution lithium-containing transition metal oxide according to an embodiment of the present invention is explained in detail below. The solid solution lithium-containing transition metal oxide according to the present embodiment contains a compound represented by the following chemical formula (1).

In the chemical formula (1), Li represents lithium, Ni represents nickel, Co represents cobalt, Mn represents manganese, and O represents oxygen. In addition, a, b, c and d satisfy the relationships: $0.39 \leq a < 0.75$, $0 \leq b \leq 0.18$, $0 < c < 1.00$, $0.05 \leq d \leq 0.25$, and $a+b+c+d=1.5$.

When the solid solution lithium-containing transition metal oxide described above is used as a positive electrode active material for a lithium ion secondary battery, the amount of hysteresis in the applied battery decreases so that high energy efficiency can be achieved. In addition, the applied battery can ensure a high discharge capacity. Namely, the oxide is suitably used as the positive electrode active material for the lithium ion secondary battery. Accordingly, such a battery can be suitably used as a lithium ion secondary battery for a drive power supply or an auxiliary power supply of a vehicle. Further, the battery is also sufficiently used as a lithium ion secondary battery for use in household or mobile appliances.

Here, the values of the respective parameters a, b, c and d in the chemical formula (1) may be specified by, for example, composition analysis by use of X-ray diffractometry.

In the description of the present invention, "a high discharge capacity" may be quantitatively evaluated as follows. First, a lithium ion secondary battery is prepared including a working electrode using the solid solution lithium-containing transition metal oxide as a positive electrode active material and a counter electrode containing a negative electrode active material such as lithium metal, a lithium alloy or graphite. The lithium ion secondary battery thus prepared is charged at a constant current at a rate of 0.1 C until the maximum voltage of the battery reaches 4.5 V, and then discharged at a constant current at a rate of 0.1 C until the minimum voltage of the battery reaches 2.0 V. When the initial discharge capacity measured at this point is 200 mAh/g or greater, it can be estimated that the discharge capacity of the battery is sufficiently high.

In the description of the present invention, "a small amount of hysteresis" may be quantitatively evaluated as follows. First, a lithium ion secondary battery is prepared including a working electrode using the solid solution lithium-containing transition metal oxide as a positive electrode active material and a counter electrode containing a negative electrode active material such as lithium metal, a lithium alloy or graphite. The lithium ion secondary battery thus prepared is charged at a constant current at a rate of 0.1 C until the maximum voltage of the battery reaches 4.5 V, and then discharged at a constant current at a rate of 0.1 C until the minimum voltage of the battery reaches 2.0 V. When the difference between the charge voltage and the discharge voltage in the state where the battery has a capacity of 100 mAh/g, is 0.25 V or smaller, it can be estimated that the amount of hysteresis of the battery is sufficiently low. Alternatively, the amount of hysteresis may also be evaluated as follows. That is, the same lithium ion secondary battery as described above is charged and discharged at a constant current. When the difference between the charge voltage and the discharge voltage in the state where a state of charge (SOC) of the battery is 40%, is 0.25 V or smaller, it can be estimated that the amount of hysteresis of the battery is sufficiently low.

In the chemical formula (1), if a, b, c and d do not satisfy the relationships: $0.39 \leq a < 0.75$, $0 \leq b \leq 0.18$, $0 < c < 1.00$, $0.05 \leq d \leq 0.25$, and $a+b+c+d=1.5$, the preferred effects of the present invention cannot be obtained. Namely, if such a compound is used, the solid solution lithium-containing transition metal oxide capable of decreasing the amount of hysteresis and achieving a high discharge capacity cannot be obtained. For example, in the chemical formula (1), if "a" is smaller than 0.39, the amount of hysteresis is above 0.25 V, which is not sufficiently low. If "a" is 0.75 or greater, the structure of the solid solution is not stabilized. In the chemical formula (1), if "b" exceeds 0.18, the amount of hysteresis is above 0.25 V, which is not sufficiently low. In the chemical formula (1), if "c" is 0 or 1.0 or greater, the structure of the solid solution is not stabilized. In the chemical formula (1), if "d" exceeds 0.25, the amount of hysteresis is above 0.25 V, which is not sufficiently low. If "d" is lower than 0.05, the discharge capacity is below 200 mAh/g, which is not sufficiently high.

With regard to the preferred range that the parameter "a" satisfies, the following may be applicable. In order to reduce the amount of hysteresis to 0.2 V or smaller, "a" is preferably 0.42 or greater. In order to further reduce the amount of hysteresis to 0.15 V or smaller, "a" is preferably in the range from 0.48 to 0.53 inclusive.

With regard to the preferred range that the parameter "b" satisfies, the following may be applicable. In order to reduce the amount of hysteresis to 0.2 V or smaller, "b" is preferably 0.11 or smaller. In order to further reduce the amount of hysteresis to 0.15 V or smaller, "b" is preferably in the range from 0.02 to 0.07 inclusive.

With regard to the preferred range that the parameter "d" satisfies, the following may be applicable. In order to reduce the amount of hysteresis to 0.2 V or smaller, "d" is preferably 0.23 or smaller. In order to achieve 220 mA/g or higher of the discharge capacity, "d" is preferably 0.05 or greater.

Figure 1A:
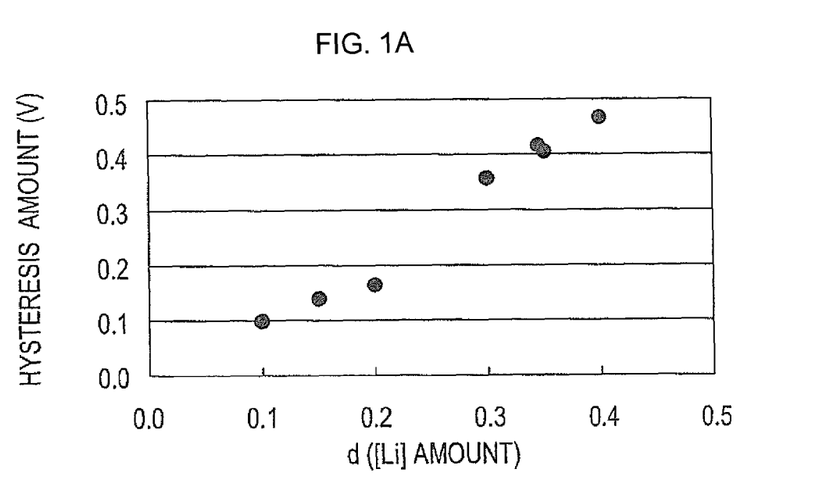
FIG. 1(A) is a graph showing a relationship between a lithium amount and a hysteresis amount.
Figure 1B:
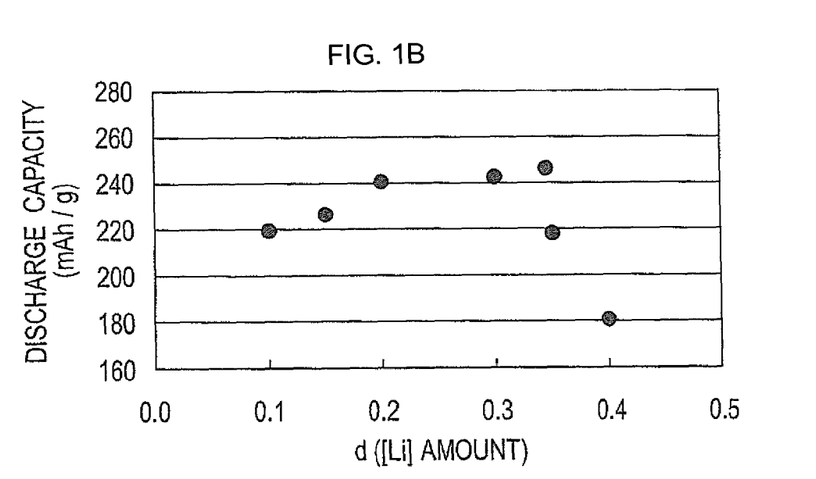
FIG. 1(B) is a graph showing a relationship between a lithium amount and a discharge capacity.
Figure 2A:
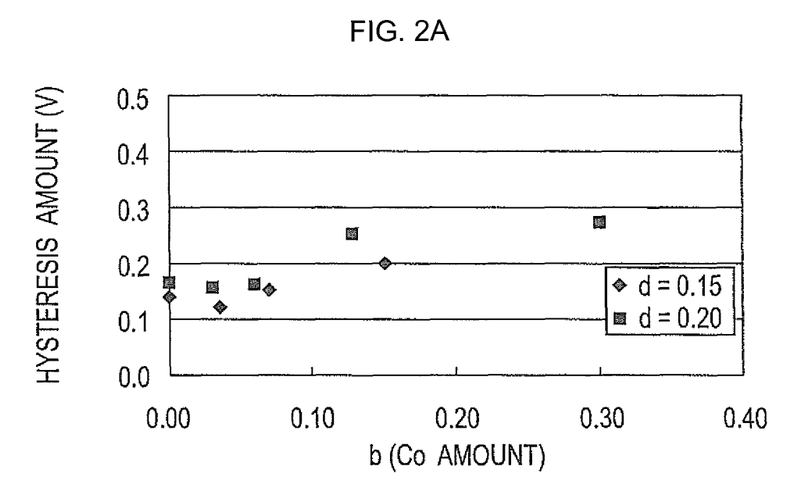
FIG. 2(A) is a graph showing a relationship between a cobalt amount and a hysteresis amount.
Figure 2B:
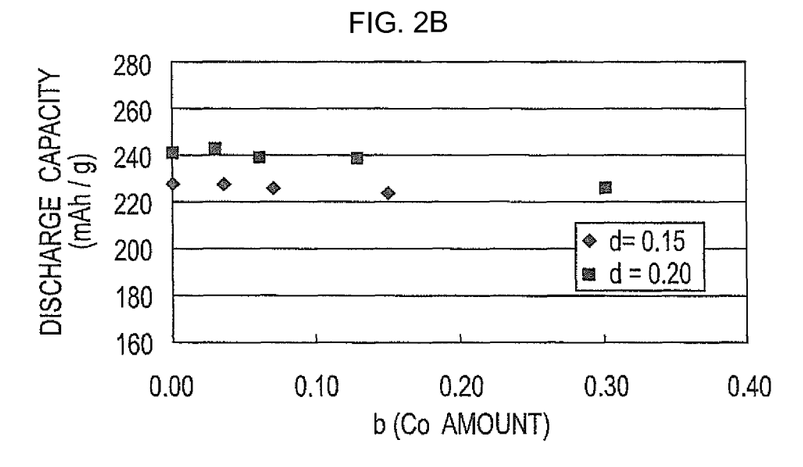
FIG. 2(B) is a graph showing a relationship between a cobalt amount and a discharge capacity.
Figure 3A:
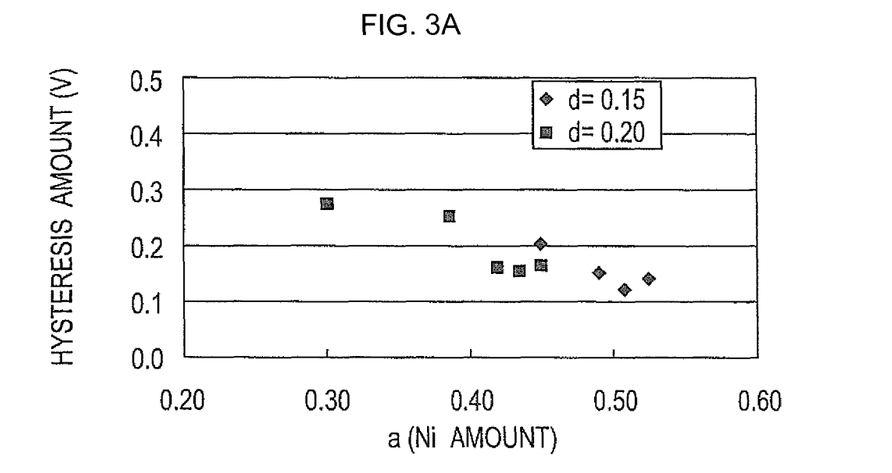
FIG. 3(A) is a graph showing a relationship between a nickel amount and a hysteresis amount.
Figure 3B:
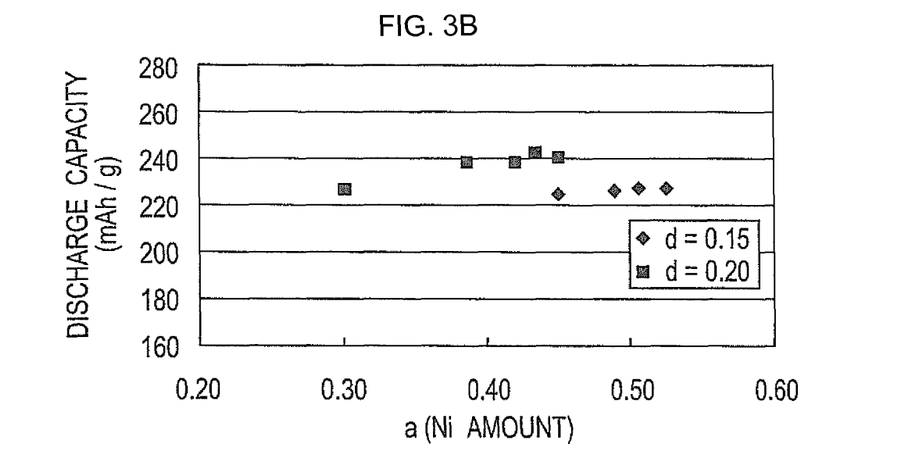
FIG. 3(B) is a graph showing a relationship between a nickel amount and a discharge capacity.

It should be noted that the respective preferred ranges of a, b and d determined are required to be determined in such a manner as to fulfill the relationship: $a+b+c+d=1.5$. FIG. 1(A) shows a relationship between the amount of lithium represented by [Li] indicated by "d" in the chemical formula (1) and the amount of hysteresis, and FIG. 1(B) shows a relationship between the amount of lithium indicated by "d" and the discharge capacity. FIG. 2(A) shows a relationship between the amount of cobalt indicated by "b" and the amount of hysteresis, and FIG. 2(B) shows a relationship between the amount of cobalt indicated by "b" and the discharge capacity. FIG. 3(A) shows a relationship between the amount of nickel indicated by "a" and the amount of hysteresis, and FIG. 3(B) shows a relationship between the amount of nickel indicated by "a" and the discharge capacity. The respective relationships are described in more detail below.

In the chemical formula (1), a, b, c and d preferably satisfy the relationships: $0.42 \leq a < 0.75$, $0 \leq b \leq 0.18$, $0 < c < 1.00$, $0.05 \leq d \leq 0.23$, and $a+b+c+d=1.5$. The regulation of the parameters as described above can further decrease the amount of hysteresis.

In the chemical formula (1), a, b, c and d further preferably satisfy the relationships: $0.42 \leq a < 0.75$, $0 \leq b \leq 0.11$, $0 < c < 1.00$, $0.05 \leq d \leq 0.23$, and $a+b+c+d=1.5$. The regulation of the parameters as described above can further decrease the amount of hysteresis and further increase the discharge capacity.

In the chemical formula (1), a, b, c and d still further preferably satisfy the relationships: $0.42 \leq a < 0.75$, $0 \leq b \leq 0.11$, $0 < c < 1.00$, $0.10 < d < 0.23$, and $a+b+c+d=1.5$. The regulation of the parameters as described above can further decrease the amount of hysteresis.

In the chemical formula (1), a, b, c and d most preferably satisfy the relationships: $0.48 \leq a < 0.53$, $0.02 \leq b \leq 0.07$, $0 < c < 1.00$, $0.10 \leq d \leq 0.23$, and $a+b+c+d=1.5$. The regulation of the parameters as described above can achieve the smallest amount of hysteresis.

As described above, the use of the solid solution lithium-containing transition metal oxide according to the present embodiment as a positive electrode active material for a lithium ion secondary battery, can decrease the amount of hysteresis and achieve high energy efficiency in the applied battery. In addition, the applied battery can ensure a high discharge capacity. Therefore, the oxide is particularly preferably used for a lithium ion secondary battery. Accordingly, such a battery can be suitably used as a lithium ion secondary battery for a drive power supply or auxiliary power supply of a vehicle. Further, the battery is also sufficiently used as a lithium ion secondary battery for use in household or mobile appliances.

[Method of Preparing Solid Solution Lithium-Containing Transition Metal Oxide]

Next, a method of preparing the solid solution lithium-containing transition metal oxide according to the embodiment of the present invention is explained in detail below with reference to several examples.

As an example of the method of preparing the solid solution lithium-containing transition metal oxide according to the present embodiment, a precursor of the solid solution lithium-containing transition metal oxide can be obtained as follows. First, raw materials, such as sulfates and nitrates, including a lithium compound, a nickel compound, a cobalt compound and a manganese compound are mixed to obtain a mixture. The mixture thus obtained is then baked at the temperature of 800° C. or higher and 1000° C. or lower for 6 hours or longer and 24 hours or shorter under an inert gas atmosphere, so as to obtain the desired precursor of the solid solution lithium-containing transition metal oxide.

Another example of the method of obtaining the precursor of the solid solution lithium-containing transition metal oxide is explained below. First, raw materials, such as sulfates and nitrates, including a lithium compound, a nickel compound, a cobalt compound and a manganese compound are mixed to obtain a mixture. The mixture thus obtained is then baked at the temperature of 800° C. or higher and 1000° C. or lower for 6 hours or longer and 24 hours or shorter to obtain a baked product. The baked product thus obtained is subjected to heat treatment at the temperature of 600° C. or higher and 800° C. or lower under an inert gas atmosphere, so as to obtain the desired precursor of the solid solution lithium-containing transition metal oxide.

After the precursor of the solid solution lithium-containing transition metal oxide represented by the chemical formula (1) is obtained by the method described above, the precursor is subjected to oxidation treatment so as to obtain the solid solution lithium-containing transition metal oxide according to the present embodiment. Examples of the oxidation treatment include: (1) charge or charge/discharge in a predetermined potential range (electrochemical pretreatment, charge/discharge pretreatment); (2) oxidation with an oxidizing agent corresponding to charge; and (3) oxidation using a redox mediator. Here, (1) charge or charge/discharge in a predetermined potential range is, in particular, charge or charge/discharge performed from a low potential range in which a large change of the crystal structure of the lithium-containing transition metal oxide is not brought about from the beginning. An example of the oxidizing agent used in the oxidation treatment (2) may be halogen such as bromine and chlorine. For example, the preparation of the solid solution lithium-containing transition metal oxide based on the oxidation treatment (1) may be carried out as follows. First, a working electrode is obtained by use of the precursor of the solid solution lithium-containing transition metal oxide obtained as described above. Then, charge or charge/discharge in a predetermined potential range is performed by use of the working electrode thus obtained, so as to obtain the desired solid solution lithium-containing transition metal oxide.

The example of the method of preparing the precursor of the solid solution lithium-containing transition metal oxide is explained in more detail below. For example, the method of preparing the precursor of the solid solution lithium-containing transition metal oxide may employ a conventional method of preparing a solid solution lithium-containing transition metal oxide used as a positive electrode active material for a lithium ion secondary battery as appropriate. First, 2 mol/L of an aqueous solution of each of nickel sulfate, cobalt sulfate and manganese sulfate is prepared. A predetermined amount of each of the aqueous solutions thus prepared is weighed out so as to prepare a mixed solution thereof. Subsequently, ammonia water is dropped into the mixed solution until the mixed solution is adjusted to pH 7 while being stirred by a magnetic stirrer. Further, 2 mol/L of an aqueous solution of sodium carbonate is dropped therein, and nickel-cobalt-manganese composite carbonate is precipitated. Subsequently, the precipitate thus obtained is aspirated and filtrated, washed, and then dried at a predetermined temperature for a predetermined period of time. The predetermined drying conditions can be, for example, approximately 120° C. and 5 hours. The dried product thus obtained is further calcined at a predetermined temperature for a predetermined period of time. The predetermined calcining conditions can be, for example, approximately 500° C. and 5 hours. Subsequently, lithium hydroxide is added thereto in a predetermined molar ratio and mixed together by use of an automatic mortar for a predetermined period of time. This mixing process may be carried out for approximately 30 minutes. The mixture is then subjected to main baking at a predetermined temperature for a predetermined period of time. The main baking conditions can be, for example, approximately 900° C. and 12 hours. Thereafter, the baked product is subjected to heat treatment at a predetermined temperature for a predetermined period of time under a predetermined atmosphere, so as to obtain the desired precursor of the solid solution lithium-containing transition metal oxide. The conditions of the heat treatment can be, for example, 600° C. and 12 hours under a nitrogen atmosphere. Instead of the main baking and the following heat treatment, the mixture may be baked at a predetermined temperature for a predetermined period of time under a predetermined atmosphere to obtain a similar precursor of the solid solution lithium-containing transition metal oxide. The predetermined baking conditions can be, for example, 900° C. and 12 hours under a nitrogen atmosphere.

The example of the method of preparing the solid solution lithium-containing transition metal oxide is explained in more detail below. First, a working electrode is obtained by use of the precursor of the solid solution lithium-containing transition metal oxide obtained as described above. Then, charge or charge/discharge is performed by use of the working electrode thus obtained in a manner such that the maximum potential in a predetermined potential range is adjusted to 4.3 V or higher and less than 4.8 V with respect to a counter electrode using a negative electrode active material such as lithium metal, a lithium alloy or graphite. Accordingly, the desired solid solution lithium-containing transition metal oxide can be obtained.

[Lithium Ion Secondary Battery]

Next, a lithium ion secondary battery according to an embodiment of the present invention will be explained with reference to the drawing. It should be noted that dimensional ratios in the drawing, which is incorporated by reference in the following embodiment, are magnified for convenience of explanation and may be different from actual ratios.

Figure 4:
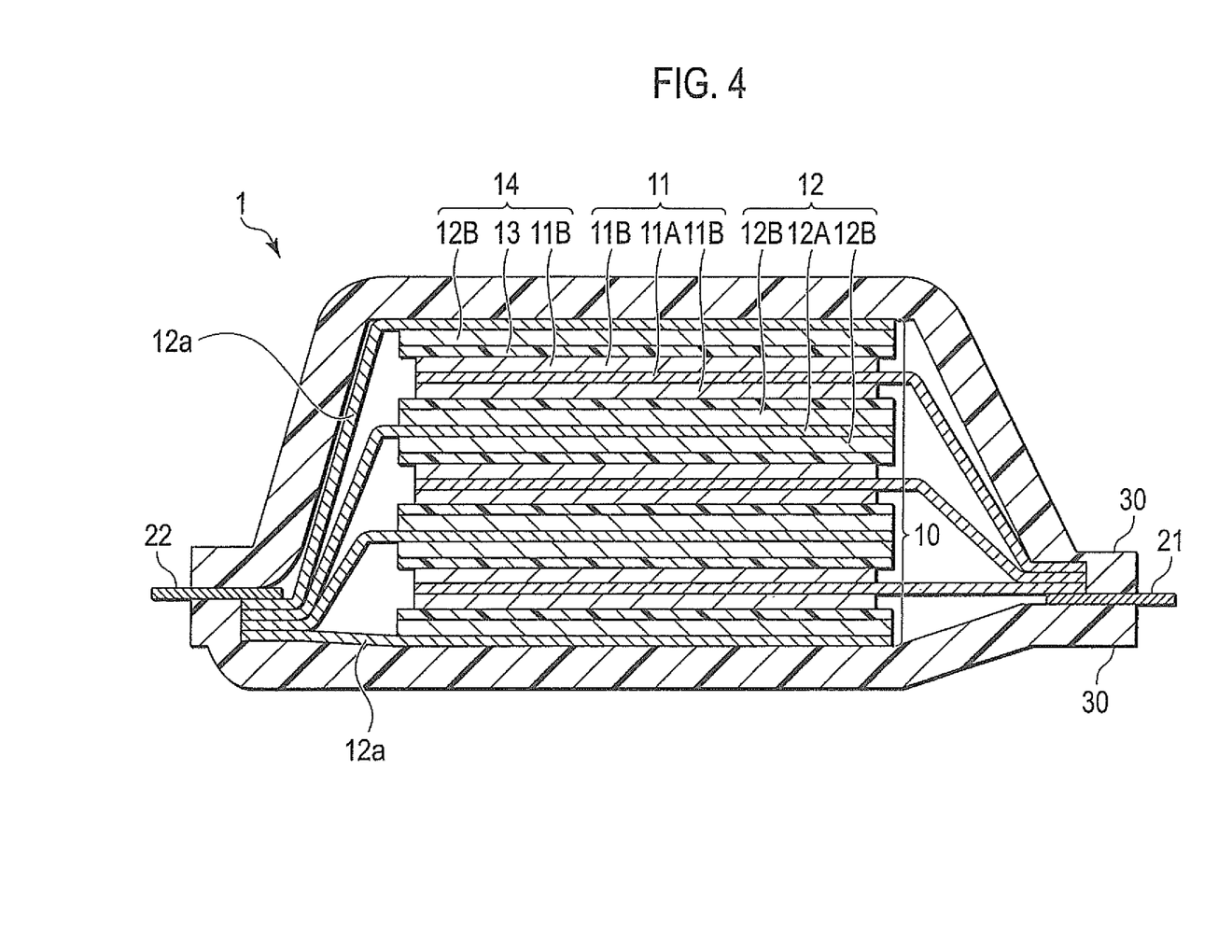
FIG. 4 is a schematic cross-sectional view showing an example of a lithium ion secondary battery according to an embodiment of the present invention.

The lithium ion secondary battery according to the present embodiment may have, for example, a configuration as shown in FIG. 4. Such a lithium ion secondary battery is called a laminated-type lithium ion secondary battery.

As shown in FIG. 4, the lithium ion secondary battery 1 according to the present embodiment has a configuration in which a battery element 10 to which a positive electrode lead 21 and a negative electrode lead 22 are attached, is enclosed in an exterior body 30 made of a laminated film. In the present embodiment, the positive electrode lead 21 and the negative electrode lead 22 are exposed to the outside of the exterior body 30 on opposite sides. Although not shown in the figure, the positive electrode lead and the negative electrode lead may be exposed to the outside of the exterior body on the same side. In addition, the positive electrode lead 21 and the negative electrode lead 22 may be attached to positive electrode current collectors 11A and negative electrode current collectors 12A described below by, for example, ultrasonic welding or resistance welding.

The positive electrode lead 21 and the negative electrode lead 22 may contain, for example, a metal material such as aluminum (Al), copper (Cu), titanium (Ti), nickel (Ni), an alloy thereof, or stainless steel (SUS). It should be noted that the metal material is not limited thereto, and conventionally-known materials used as leads for lithium ion secondary batteries may also be used.

The positive electrode lead 21 and the negative electrode lead 22 may contain the same material, or may contain different materials. The leads may be prepared preliminarily and then connected to the positive electrode current collectors 11A and the negative electrode current collectors 12A described below according to the present embodiment. Alternatively, each of the positive electrode current collectors 11A and the negative electrode current collectors 12A described below may be elongated to serve as the respective leads. Although not shown in the figure, each part of the positive electrode lead and the negative electrode lead exposed to the outside of the exterior body is preferably covered with, for example, a heat shrinkable tube having a heat resistant and insulating property. This configuration can prevent damage such as a short circuit caused by contact with peripheral devices or wires and decrease the chances of any negative influence on products such as components in a vehicle, in particular, electronic devices.

In addition, although not shown in the figure, current collecting plates may be used to extract and lead a current to the outside of the battery. Such current collecting plates are electrically connected to the current collectors and the leads and are exposed to the outside of the laminated film which is an outer package material of the battery. The material constituting the current collecting plates is not particularly limited and may be conventionally-known materials with high electric conductivity conventionally used for current collecting plates for lithium ion secondary batteries. For example, the constituent material of the current collecting plates is preferably a metal material such as aluminum (Al), copper (Cu), titanium (Ti), nickel (Ni), an alloy thereof, or stainless steel (SUS). Among these materials, aluminum (Al) or copper (Cu) is particularly preferable in view of lightness, corrosion resistance and high electric conductivity. The positive electrode current collecting plate and the negative electrode current collecting plate may contain the same material, or may contain different materials.

The exterior body 30 is preferably made of a film-like outer package material in view of, for example, a reduction in size and weight. However, the exterior body 30 is not limited thereto, and conventionally known materials used for exterior bodies for lithium ion secondary batteries may be used. Namely, a metal can case may also be applicable.

An example of the outer package material may be a polymer-metal composite laminated film having high heat conductivity. In particular, an exterior body can be suitably used, which is made of an outer package material of a laminated film having a three-layer structure in which polypropylene serving as a thermocompression layer, aluminum serving as a metal layer, and nylon serving as an outer protection layer are stacked in this order Such a material is preferable in view of high output power and cooling performance and is therefore suitably used for a battery for a large apparatus such as an electric vehicle and a hybrid electric vehicle.

Note that, in place of the above-mentioned laminated film, the exterior body 30 may be made of, for example, a laminated film not including a metal material, a polymer film such as polypropylene, or a metal film.

A general configuration of the exterior body 30 may be represented by a stacked structure of an outer protection layer/a metal layer/a thermocompression layer. Note that the outer protection layer and the thermocompression layer may each be composed of plural layers. The metal layer is only required to function as an impermeable barrier film. Not only aluminum foil but also stainless steel foil, nickel foil and plated iron foil may also be used as the metal layer. Among these, aluminum foil which is thin and lightweight with high workability, is particularly suitable.

Examples of the configuration usable for the exterior body 30 in the form of "the outer protection layer/the metal layer/the thermocompression layer" include: nylon/aluminum/cast polypropylene; polyethylene terephthalate/aluminum/cast polypropylene; polyethylene terephthalate/aluminum/polyethylene terephthalate/cast polypropylene; polyethylene terephthalate/nylon/aluminum/cast polypropylene; polyethylene terephthalate/nylon/aluminum/nylon/cast polypropylene; polyethylene terephthalate/nylon/aluminum/nylon/polyethylene; nylon/polyethylene/aluminum/straight-chain low-density polyethylene; polyethylene terephthalate/polyethylene/aluminum/polyethylene terephthalate/low-density polyethylene; and polyethylene terephthalate/nylon/aluminum/low-density polyethylene/cast polypropylene.

As shown in FIG. 4, the battery element 10 has a configuration in which several sets of a positive electrode 11, an electrolyte layer 13 and a negative electrode 12 are stacked on top of each other, the positive electrode 11 including positive electrode active material layers 11B formed on both main surfaces of a positive electrode current collector 11A, the negative electrode 12 including negative electrode active material layers 12B formed on both main surfaces of a negative electrode current collector 12A. In this case, the positive electrode active material layer 11B formed on one main surface of the positive electrode current collector 11A in one positive electrode 11, faces the negative electrode active material layer 12B formed on one main surface of the negative electrode current collector 12A in the negative electrode 12 adjacent to the one positive electrode 11 while the electrolyte layer 13 is interposed therebetween. In such a way, several sets of the positive electrode 11, the electrolyte layer 13 and the negative electrode 12 arranged in this order are stacked on top of each other.

As described above, the positive electrode active material layer 11B, the electrolyte layer 13 and the negative electrode active material layer 12B adjacent to each other constitute one single cell layer 14. Namely, the lithium ion secondary battery 1 according to the present embodiment has a configuration in which the plural single cell layers 14 are stacked so as to be electrically connected in parallel to one another. Here, each of the positive electrodes 11 and the negative electrodes 12 may have a configuration in which each active material layer is formed on one main surface of each current collector. In this embodiment, for example, the negative electrode current collectors 12a located on the respective outermost layers of the battery element 10 are each provided with the negative electrode active material layer 12B only on one surface thereof.

Although not shown in the figure, insulation layers may be provided on the outer circumferences of the single cell layers 14 so as to isolate the respective positive electrode current collectors 11A from the respective negative electrode current collectors 12A adjacent thereto. Such an insulation layer is preferably made of a material capable of holding an electrolyte contained in the electrolyte layer and preventing liquid leakage of the electrolyte. Specific examples of the material include general-purpose plastic and thermoplastic olefin rubber such as polypropylene (PP), polyethylene (PE), polyurethane (PUR), polyamide-based resin (PA), polytetrafluoroethylene (PTFE), polyvinylidene fluoride (PVDF), and polystyrene (PS). Alternatively, silicone rubber may also be used.

The positive electrode current collector 11A and the negative electrode current collector 12A each include an electrically conductive material. The size of the current collectors may be determined depending on the intended use of the battery. For example, current collectors having large areas are used for a large-size battery for which high energy density is required. The thickness of the current collectors is not particularly limited; however, the thickness is generally approximately in the range from 1 μm to 100 μm. The shape of the current collectors is not particularly limited. The battery element 10 shown in FIG. 4 may use not only current collecting foil but also a current collector having a mesh pattern such as an expanded grid. The current collecting foil is suitably used when a thin film alloy as an example of the negative electrode active material is directly formed on the negative electrode current collector 12A by, for example, a sputtering method.

The material contained in the current collectors is not particularly limited. The material may be metal or resin in which electrically conductive filler is added to an electrically conductive polymer material or a non-conductive polymer material. Specific examples of the metal include aluminum (Al), nickel (Ni), iron (Fe), stainless steel (SUS), titanium (Ti), and copper (Cu). In addition, a clad metal of nickel (Ni) and aluminum (Al), a clad metal of copper (Cu) and aluminum (Al), or a plated material of these metals combined together, is preferably used. A foil in which the metal surface is covered with aluminum (Al) may also be used. Among these, aluminum (Al), stainless steel (SUS), copper (Cu) or nickel (Ni) is preferable in view of electron conductivity and battery operation potential.

Examples of the electrically conductive polymer material include polyaniline, polypyrrole, polythiophene, polyacetylene, polyparaphenylene, polyphenylene vinylene, polyacrylonitrile, and polyoxadiazole. These electrically conductive polymer materials are preferable in view of facilitation of the production process or a reduction in weight of the current collectors, since these materials have sufficient electric conductivity even if electrically conductive filler is not added thereto.

Examples of the non-conductive polymer material include polyethylene (PE) such as high-density polyethylene (HDPE) and low-density polyethylene (LDPE), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), and polystyrene (PS). These non-conductive polymer materials have high potential resistance or solvent resistance.

The electrically conductive filler may be added as necessary to the electrically conductive polymer material or the non-conductive polymer material. In particular, when resin serving as a base material of the current collector only includes a non-conductive polymer, the electrically conductive filler may be used to impart electric conductivity to the resin. The electrically conductive filler is not particularly limited as long as it is a substance having electric conductivity. Examples of the material having high electric conductivity, potential resistance or a lithium ion insulation property include metal and electrically conductive carbon. A preferable example of the metal may be at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb), and potassium (K), or an alloy or a metal oxide containing these metals. A preferable example of the electrically conductive carbon may be at least one material selected from the group consisting of acetylene black, Vulcan, Black Pearl, carbon nanofiber, Ketjen Black, carbon nanotube, carbon nanohorn, carbon nanoballoon, and fullerene. The amount of the electrically conductive filler added is not particularly limited as long as it imparts sufficient electric conductivity to the current collectors. In general, the amount thereof is approximately in the range from 5% by mass to 35% by mass. However, the material of the current collectors is not limited to the materials described above, and any conventionally-known material used for current collectors for lithium ion secondary batteries may be used.

The positive electrode active material layer 11B contains, as the positive electrode active material, at least one kind of the solid solution lithium-containing transition metal oxides according to the embodiment of the present invention described above. Namely, the positive electrode active material layer 11B contains one of or two or more kinds of the above-mentioned positive electrode materials capable of absorbing and releasing lithium. Here, a binder and an electric conducting additive may be contained therein as necessary. Since the positive electrode 11 contains the materials described above, the lithium ion secondary battery 1 according to the present embodiment can decrease the amount of hysteresis, achieve high energy efficiency, and ensure a high discharge capacity.

The binder is not particularly limited; however, the following materials may be used. Examples of the binder include: a thermoplastic polymer such as polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), an ethylene-vinyl acetate copolymer, polyvinyl chloride (PVC), styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof; fluorine resin such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoro ethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and epoxy resin. Among these, polyvinylidene fluoride, polyimide, styrene-butadiene rubber, carboxymethyl cellulose, polypropylene, polytetrafluoroethylene, polyacrylonitrile or polyamide, is particularly preferable. These binders are suitable for use in the active material layers of the positive and negative electrodes since these binders have high heat resistance, have quite a wide potential window, and are stable with respect to both positive electrode potential and negative electrode potential. However, the binder is not limited to these materials, and any conventionally-known material used for binders for lithium ion secondary batteries may be used. Each of these materials for the binder may be used singly, or two or more thereof may be combined together.

The amount of the binder contained in the positive electrode active material layer 11B is not particularly limited as long as it is sufficient to bind the positive electrode active material. However, the amount of the binder contained in the positive electrode active material layer 11B is preferably in the range from 0.5% by mass to 15% by mass, more preferably in the range from 1% by mass to 10% by mass.

The electric conducting additive is added to the positive electrode active material layer 11B in order to improve the electric conductivity thereof. The electric conducting additive may be a carbon material such as carbon black (for example, acetylene black), graphite, and vapor deposited carbon fiber. However, the electric conducting additive is not limited to these materials, and any conventionally-known material used for electric conducting additives for lithium ion secondary batteries may be used. Each of these materials for the electric conducting additive may be used singly, or two or more thereof may be combined together. The addition of the electric conducting additive to the positive electrode active material layer 11B can contribute to effectively establishing an electronic network in the positive electrode active material layer 11B and thereby improving the output performance of the battery.

The electric conducting additive and the binder described above may be replaced with an electrically conductive binder having both functions of the electric conducting additive and the binder. Alternatively, the electrically conductive binder may be used together with one of or both the electric conducting additive and the binder. The electrically conductive binder may be a commercially available binder such as TAB-2 (manufactured by Hohsen Corporation).

The negative electrode active material layer 12B contains, as the negative electrode active material, lithium, a lithium alloy, or a negative electrode material capable of absorbing and releasing lithium, and may contain a binder and an electric conducting additive as necessary. The binder and the electric conducting additive may be the same as those described above.

An example of the negative electrode material capable of absorbing and releasing lithium may be a carbon material such as graphite that is highly crystalline carbon (such as natural graphite and artificial graphite), low crystalline carbon (such as soft carbon and hard carbon), carbon black (such as Ketjen black, acetylene black, channel black, lamp black, oil furnace black, and thermal black), fullerene, carbon nanotube, carbon nanofiber, carbon nanohorn, and carbon fibril. Another example may be a single substance alloyed with lithium, such as silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te), and chlorine (Cl). Still another example may be an oxide or a carbide containing the elements described above, such as silicon monoxide (SiO), $SiO_x$ (0<x<2), tin dioxide ($SnO_2$), $SnO_x$(0<x<2), and $SnSiO_3$. The carbide may be silicon carbide (SiC). Other examples of the negative electrode material include a metal material such as lithium metal, and a lithium-transition metal composite oxide such as a lithium-titanium composite oxide, for example, lithium titanate ($Li_4Ti_5O_{12}$). However, the negative electrode active material is not limited to these materials, and any conventionally-known material used for negative electrode active materials for lithium ion secondary batteries may be used. Each of these negative electrode active materials may be used singly, or two or more thereof may be combined together.

The thickness of each of the respective active material layers, namely, the thickness of each active material layer provided on one surface of each current collector, is not particularly limited and may be determined by referring to conventional knowledge about batteries. For example, the thickness of each active material layer is generally approximately in the range from 1 μm to 500 μm, preferably in the range from 2 μm to 100 μm, in view of output performance, energy characteristics, and ion conductivity depending on the intended use of the battery.

In the case where the respective active materials require different particle diameters in order to achieve their own appropriate effects, the active materials having different particle diameters may be mixed and used together so as to optimally function to achieve their own effects. Thus, it is not necessary to equalize the particle diameter of all of the active materials. For example, when an oxide in a particle state is used as the positive electrode active material, the average particle diameter of the oxide is not particularly limited and may be substantially the same as that of positive electrode active materials contained in existing positive electrode active material layers. The average particle diameter may be preferably in the range from 1 μm to 20 μm in view of higher output power. However, the average particle diameter is not limited thereto or does not necessarily fall within this range as long as it can achieve the effects of the present embodiment appropriately.

Note that, in the description of the present invention, "the particle diameter" represents the greatest length between any two points on the circumference of the active material particle observed by observation means such as a scanning electron microscope (SEM) and a transmission electron microscope (TEM). In addition, "the average particle diameter" represents a value calculated as an average value of particle diameters of the particles observed in several to several tens of fields of view with the scanning electron microscope (SEM) or the transmission electron microscope (TEM). Particle diameters and average particle diameters of other constituents may be determined in the same manner.

The electrolyte layer 13 may have a layer structure using, for example, an electrolysis solution held in a separator described below, a polymer gel electrolyte, or a solid polymer electrolyte. Further, the electrolyte layer 13 may have a stacked structure using the polymer gel electrolyte or the solid polymer electrolyte.

The electrolysis solution is preferably a common electrolysis solution generally used in lithium ion secondary batteries. In particular, the electrolysis solution having a constitution in which supporting salt (lithium salt) is dissolved in an organic solvent, may be used. The lithium salt may be at least one kind selected from the group consisting of inorganic acid anion salts such as lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluorotantalate ($LiTaF_6$), lithium tetrachloroaluminate ($LiAlCl_4$), and lithium decachlorodecaborate ($Li_2B_{10}Cl_{10}$). Alternatively, the lithium salt may be at least one kind selected from the group consisting of organic acid anion salts such as lithium trifluoromethane sulfonate ($LiCF_3SO_3$), lithium bis(trifluoromethanesulfonyl)imide ($Li(CF_3SO_2)_2N$), and lithium bis (pentafluoroethanesulfonyl)imide ($Li(C_2F_5SO_2)_2N$).

Examples of the organic solvent include: cyclic carbonate such as propylene carbonate (PC) and ethylene carbonate (EC); chain carbonate such as dimethyl carbonate (DMC), ethyl methyl carbonate (EMC), and diethyl carbonate (DEC); ether such as tetrahydrofuran, 2-methyltetrahydrofuran, 1,4-dioxane, 1,2-dimethoxyethane, and 1,2-dibutoxyethane; lactone such as γ-butyrolactone; nitrile such as acetonitrile; ester such as methyl propionate; amide such as dimethylformamide; and ester such as methyl acetate and methyl formate. The organic solvent such as an aprotic solvent including one of or two or more of these materials mixed together may be used.

Examples of the separator include a microporous membrane, a porous flat plate and a non-woven fabric containing polyolefin such as polyethylene (PE) and polypropylene (PP).

The polymer gel electrolyte may be obtained in a manner such that the electrolysis solution generally used in lithium ion secondary batteries described above is contained in the solid polymer electrolyte having ion conductivity. However, the polymer gel electrode is not limited thereto and may be obtained in a manner such that a similar electrolysis solution is held in a framework of a polymer with no lithium ion conductivity. Alternatively, a polymer gel electrolyte may be used in which a polymer and an electrolysis solution constituting the polymer gel electrolyte are contained in a conventionally-known ratio. For example, the ratio is preferably in the range from a small percentage by mass to 98% by mass in view of ion conductivity.

Examples of the polymer with no lithium ion conductivity used in the polymer gel electrolyte include polyvinylidene fluoride (PVDF), polyvinyl chloride (PVC), polyacrylonitrile (PAN), and polymethyl methacrylate (PMMA). However, the polymer is not particularly limited thereto. Here, polyacrylonitrile (PAN) and polymethyl methacrylate (PMMA) are materials which hardly exert ion conductivity. Although these polymers could be defined as a polymer having ion conductivity, the examples described above are defined as a polymer with no lithium ion conductivity used in the polymer gel electrolyte in the present embodiment.

The solid polymer electrolyte may be an electrolyte having a constitution in which the lithium salt is dissolved in, for example, polyethylene oxide (PEO) or polypropylene oxide (PPO), but no organic solvent is contained. Therefore, there is no risk of liquid leakage from the battery when the electrolyte layer contains the solid polymer electrolyte and accordingly, the reliability of the battery can be increased.

The electrolyte layer is preferably thinner in view of a reduction in internal resistance. The thickness of the electrolyte layer is generally in the range from 1 μm to 100 μm, preferably in the range from 5 μm to 50 μm.

Here, a matrix polymer of the polymer gel electrolyte and the solid polymer electrolyte can exhibit high mechanical strength when a cross-linked structure is formed. The cross-linked structure may be formed in a manner such that a polymerizable polymer used for polymer electrolyte formation is subjected to polymerization, such as thermal polymerization, ultraviolet polymerization, radiation polymerization or electron beam polymerization, by use of an appropriate polymerization initiator. Examples of the polymerizable polymer include polyethylene oxide (PEO) and polypropylene oxide (PPO).

[Method for Manufacturing Lithium Ion Secondary Battery]

Next, a method for manufacturing the lithium ion secondary battery according to the embodiment of the present invention is explained below with reference to several examples.

An example of the method for manufacturing the lithium ion secondary battery according to the present embodiment is explained below. First, the positive electrode is prepared. When a granular positive electrode active material is used, for example, the solid solution lithium-containing transition metal oxide described above is mixed with an electric conducting additive, a binder and a viscosity control solvent as necessary to prepare positive electrode slurry. Subsequently, the positive electrode slurry thus obtained is applied to the positive electrode current collector, and then dried and pressure-molded, so as to form the positive electrode active material layer.

Next, the negative electrode is prepared. When a granular negative electrode active material is used, for example, the negative electrode active material is mixed with an electric conducting additive, a binder and a viscosity control solvent as necessary to prepare negative electrode slurry. Subsequently, the negative electrode slurry thus obtained is applied to the negative electrode current collector, and then dried and pressure-molded, so as to form the negative electrode active material layer.

Subsequently, the positive electrode lead is attached to the positive electrode, the negative electrode lead is attached to the negative electrode, and the positive electrode, the separator and the negative electrode are stacked on top of each other. The stacked element is inserted between polymer-metal composite laminated sheets, and the peripheral edges thereof are sealed by heat except one side, so as to obtain an exterior body formed in a bag shape.

Thereafter, lithium salt such as lithium hexafluorophosphate and a non-aqueous electrolyte containing an organic solvent such as ethylene carbonate are prepared, and these are injected into the exterior body from the opening, and the opening of the exterior body is then sealed by heat. This completes the laminated-type lithium ion secondary battery.

Another example of the method for manufacturing the lithium ion secondary battery is explained below. First, the positive electrode is prepared. When a granular positive electrode active material is used, for example, the precursor of the solid solution lithium-containing transition metal oxide described above is mixed with an electric conducting additive, a binder and a viscosity control solvent as necessary to prepare positive electrode slurry. Subsequently, the positive electrode slurry thus obtained is applied to the positive electrode current collector, and then dried and pressure-molded, so as to form the positive electrode active material layer.

Next, the negative electrode is prepared. When a granular negative electrode active material is used, for example, the negative electrode active material is mixed with an electric conducting additive, a binder and a viscosity control solvent as necessary to prepare negative electrode slurry. Subsequently, the negative electrode slurry thus obtained is applied to the negative electrode current collector, and then dried and pressure-molded, so as to form the negative electrode active material layer.

Subsequently, the positive electrode lead is attached to the positive electrode, the negative electrode lead is attached to the negative electrode, and the positive electrode, the separator and the negative electrode are stacked on top of each other. The stacked element is inserted between polymer-metal composite laminated sheets, and the peripheral edges thereof are sealed by heat except one side, so as to obtain an exterior body formed in a bag shape.

Thereafter, lithium salt such as lithium hexafluorophosphate and a non-aqueous electrolyte containing an organic solvent such as ethylene carbonate are prepared, and these are injected into the exterior body from the opening, and the opening of the exterior body is then sealed by heat. Further, the sealed body is subjected to the above-described predetermined charge or charge/discharge. This completes the laminated-type lithium ion secondary battery.

EXAMPLES

Hereinafter, the present invention is explained in more detail with reference to Examples and Comparative Examples; however, the present invention is not limited only to these examples.

Example 1

<Composition and Property of Positive Electrode Active Material 1> Composition formula: $Li_{1.5}[Ni_{0.5075}Co_{0.035}Mn_{0.8075}[Li]_{0.15}]O_3$ (a+b+c+d=1.5, d=0.15)

First, 2 mol/L of an aqueous solution of each of nickel sulfate, cobalt sulfate and manganese sulfate was prepared. A predetermined amount of each of the aqueous solutions was weighed out so as to prepare a mixed solution thereof. Subsequently, ammonia water was dropped into the mixed solution until the mixed solution was adjusted to pH 7 while being stirred by a magnetic stirrer. Further, 2 mol/L of an aqueous solution of sodium carbonate was dropped therein, and nickel-cobalt-manganese composite carbonate was precipitated. The precipitate thus obtained was aspirated and filtrated, washed, and then dried at a predetermined temperature for a predetermined period of time. In particular, the precipitate was dried approximately at 120° C. for 5 hours. The dried product thus obtained was calcined at a predetermined temperature for a predetermined period of time. In particular, the dried product was calcined approximately at 500° C. for 5 hours. Subsequently, lithium hydroxide was added thereto in a predetermined molar ratio and mixed together by use of an automatic mortar for a predetermined period of time which was approximately 30 minutes. The mixture was then subjected to main baking at a predetermined temperature for a predetermined period of time. In particular, the mixture was baked approximately at 900° C. for 12 hours. Thereafter, the baked product was subjected to heat treatment at a predetermined temperature for a predetermined period of time under a predetermined atmosphere; approximately at 600° C. for 12 hours under a nitrogen atmosphere, so as to obtain a precursor of a solid solution lithium-containing transition metal oxide.

<Composition of Positive Electrode Slurry> Positive Electrode Active Material 1: $Li_{1.5}[Ni_{0.5075}Co_{0.035}Mn_{0.8075}[Li]_{0.15}]O_3$ (85 Parts by Weight)

Electric conducting additive: acetylene black (10 parts by weight)

Binder: polyvinylidene fluoride (PVDF) (5 parts by weight)

Solvent: N-methylpyrrolidone (NMP)

<Preparation/Application/Drying of Positive Electrode Slurry> First, 85 parts by weight of the positive electrode active material, 10 parts by weight of acetylene black and 5 parts by weight of polyvinylidene fluoride serving as a binder were kneaded. Subsequently, N-methylpyrrolidone (NMP) was added thereto and mixed together to prepare positive electrode slurry. The positive electrode slurry thus obtained was applied onto aluminum foil serving as a current collector in a manner such that the amount of the active material applied was 10 mg per unit area of 100 mm². The obtained product was dried by use of a dryer at 120° C. for 4 hours so as to obtain a positive electrode. The diameter of the positive electrode was set to 15 mm.

<Composition of Negative Electrode Slurry>

Negative electrode active material: graphite (85 parts by weight)

Electrically conductive binder: TAB-2 (15 parts by weight)

Solvent: N-methylpyrrolidone (NMP)

<Preparation/Application/Drying of Negative Electrode Slurry> First, 85 parts by weight of the negative electrode active material and 15 parts by weight of the electrically conductive binder were kneaded. Subsequently, N-methylpyrrolidone (NMP) was added thereto and mixed together to prepare negative electrode slurry. Here, the above-mentioned TAB-2 contains acetylene black and polytetrafluoroethylene (PTFE) in a weight ratio of 1:1. The negative electrode slurry thus obtained was applied onto a stainless mesh serving as a current collector in a manner such that the amount of the active material applied was 10 mg per unit area of 100 mm². The obtained product was dried by use of a dryer at 120° C. for 4 hours so as to obtain a negative electrode. The diameter of the positive electrode was set to 16 mm.

<Manufacture of Lithium Ion Secondary Battery> The positive electrode and the negative electrode were placed to face each other, and two separators were interposed therebetween. The separators employed a material having a thickness of 20 µm made of polypropylene. Subsequently, the staked body of the negative electrode, the separators and the positive electrode was placed on the bottom side of a coin cell (CR2032) made of stainless steel (SUS316). In addition, a gasket was attached for keeping the insulation property between the positive electrode and the negative electrode, and an electrolysis solution described below was injected thereto by use of a syringe. A spring and a spacer were stacked thereon, and the upper side of the coin cell was superimposed and crimped to be sealed, so that a lithium ion secondary battery was manufactured. The electrolysis solution used was obtained as follows. First, an organic solvent in which ethylene carbonate (EC) and diethyl carbonate (DEC) were mixed in a volume ratio of EC:DEC=1:2, was prepared. Subsequently, lithium hexafluorophosphate ($LiPF_6$) as supporting salt was dissolved therein at a concentration of 1 mol/L to obtain the electrolysis solution.

<Electrochemical Pretreatment> At the first cycle, the battery was charged at a constant current at a rate of 0.1 C until the maximum voltage of the battery reached 4.45 V and then discharged at a constant current at a rate of 0.1 C until the minimum voltage of the battery reached 2.0 V. At the second cycle, the battery was charged at a constant current at a rate of 0.1 C until the maximum voltage of the battery reached 4.55 V and then discharged at a constant current at a rate of 0.1 C until the minimum voltage of the battery reached 2.0 V. At the third cycle, the battery was charged at a constant current at a rate of 0.1 C until the maximum voltage of the battery reached 4.65 V and then discharged at a constant current at a rate of 0.1 C until the minimum voltage of the battery reached 2.0 V. At the fourth cycle, the battery was charged at a constant current/a constant voltage at a rate of 0.1 C until the maximum voltage of the battery reached 4.75 V and then discharged at a constant current at a rate of 0.1 C until the minimum voltage of the battery reached 2.0 V. Accordingly, the lithium ion secondary battery of this example was obtained. Table 1 shows part of the specifications of the positive electrode active material 1. Note that the composition of the solid solution lithium-containing transition metal oxide extracted from the disassembled lithium ion secondary battery of this example was observed by X-ray diffraction analysis (XRD).

TABLE 1

| Classification | Positive Electrode Active Material Sample | Chemical Formula: $Li_{1.5}[Ni_aCo_bMn_c[Li]_d]O_3$ $0.39 \leq a < 0.75, 0 \leq b \leq 0.18, 0 < c < 1.00, 0.05 \leq d \leq 0.25, a+b+c+d=1.5$ | | | | Discharge Capacity (mAh/g) | Hysteresis Amount (V) |
|---|---|---|---|---|---|---|---|
| | | a (Ni amount) | b (Co amount) | c (Mn amount) | d ([Li] amount) | | |
| Example 1 | 1 | 0.50750 | 0.03500 | 0.80750 | 0.15000 | 227 | 0.120 |
| Example 2 | 2 | 0.49000 | 0.07000 | 0.79000 | 0.15000 | 226 | 0.150 |
| Example 3 | 3 | 0.44975 | 0.15050 | 0.74975 | 0.15000 | 224 | 0.200 |
| Example 4 | 4 | 0.43500 | 0.03000 | 0.83500 | 0.20000 | 242 | 0.152 |
| Example 5 | 5 | 0.42000 | 0.06000 | 0.82000 | 0.20000 | 238 | 0.160 |
| Example 6 | 6 | 0.38550 | 0.12900 | 0.78550 | 0.20000 | 238 | 0.250 |
| Example 7 | 7 | 0.60000 | 0.00000 | 0.80000 | 0.10000 | 220 | 0.100 |
| Example 8 | 8 | 0.52500 | 0.00000 | 0.82500 | 0.15000 | 226 | 0.138 |
| Example 9 | 9 | 0.45075 | 0.00000 | 0.84975 | 0.19950 | 240 | 0.162 |
| Comparative Example 1 | 10 | 0.75000 | 0.00000 | 0.75000 | 0.00000 | 180 | 0.050 |
| Comparative Example 2 | 11 | 0.30050 | 0.30050 | 0.69950 | 0.19950 | 226 | 0.273 |
| Comparative Example 3 | 12 | 0.20000 | 0.20000 | 0.80000 | 0.30000 | 242 | 0.355 |
| Comparative Example 4 | 13 | 0.15500 | 0.15500 | 0.84500 | 0.34500 | 246 | 0.416 |
| Comparative Example 5 | 14 | 0.20700 | 0.03750 | 0.90600 | 0.34950 | 218 | 0.407 |
| Comparative Example 6 | 15 | 0.09950 | 0.09950 | 0.90050 | 0.40050 | 181 | 0.465 |

Example 2 to Example 9, Comparative Example 1 to Comparative Example 6

Similar operations to those of Example 1 were repeated except that the respective positive electrode active materials 2 to 16 shown in Table 1 were used, so as to obtain the respective lithium ion secondary batteries of Example 2 to Example 9 and Comparative Example 1 to Comparative Example 6. The compositions of the solid solution lithium-containing transition metal oxides extracted from the disassembled lithium ion secondary batteries of the respective examples were each observed by X-ray diffraction analysis (XRD).

[Battery Performance Evaluation]

(Battery Capacity) The lithium ion secondary batteries of the respective examples were each charged at a constant current at a rate of 0.1 C until the maximum voltage of the battery reached 4.5 V and then discharged at a constant current at a rate of 0.1 C until the minimum voltage of the battery reached 2.0 V. The discharge capacity at this first cycle was defined as a discharge capacity in each example. Here, the discharge capacity is to employ a value at the fifth cycle including the electrochemical pretreatment. Table 1 also shows the results thus obtained.

(Amount of Hysteresis) The lithium ion secondary batteries of the respective examples were each charged at a constant current at a rate of 0.1 C until the maximum voltage of the battery reached 4.5 V and then discharged at a constant current at a rate of 0.1 C until the minimum voltage of the battery reached 2.0 V. With regard to the open circuit voltage curve at the first cycle thus obtained, the difference between the charge voltage and the discharge voltage in the state where the battery of each example had a capacity of 100 mAh/g, was calculated as the amount of hysteresis in each example. Here, the amount of hysteresis is to employ a value at the fifth cycle including the electrochemical pretreatment. Table 1 also shows the results thus obtained.

FIG. 1 to FIG. 3 show the results of the battery performance evaluation with regard to the discharge capacity and the amount of hysteresis in the respective examples. In particular, FIG. 1(A) and FIG. 1(B) show the relationship between the parameter d and the amount of hysteresis/the discharge capacity in Examples 7 to 9 and Comparative Examples 3 to 6. FIG. 2(A) and FIG. 2(B) show the relationship between the parameter b and the amount of hysteresis/the discharge capacity in Examples 1 to 6, 8 to 9 and Comparative Example 2. FIG. 3(A) and FIG. 3(B) show the relationship between the parameter a and the amount of hysteresis/the discharge capacity in Examples 1 to 6, 8 to 9 and Comparative Example 2.

As shown in Table 1 and FIG. 1 to FIG. 3, the batteries of Example 1 to Example 9 each have a small amount of hysteresis and a high discharge capacity compared with the batteries of Comparative Example 1 to Comparative Example 6. Namely, the batteries according to Examples can each be recognized as those having a small amount of hysteresis, achieving high energy efficiency and ensuring a high discharge capacity. In the present circumstances, it is considered that the solid solution lithium-containing transition metal oxides having the compositions shown in Examples 1 and 2 are particularly superior with regard to the amount of hysteresis and the discharge capacity.

Although the present invention has been described above by reference to the several embodiments and examples, the present invention is not limited to the descriptions thereof, and it will be apparent to those skilled in the art that various modifications and improvements can be made.

Although the laminated-type battery and the coin-type battery were exemplified as the lithium ion secondary battery in the embodiments and the examples described above, the present invention is not limited thereto. For example, the present invention is also applicable to batteries having conventionally-known forms and structures including a button-type battery and a can-type battery having a rectangular shape or a cylindrical shape.

Further, the present invention is also applicable to batteries having conventionally-known forms and structures including not only the above-mentioned stack-type (flat-type) battery but also a roll-type (cylinder-type) battery.

Further, in terms of electrical connection inside the lithium ion secondary battery, the present invention is also applicable to batteries having conventionally-known forms and structures including not only the internal parallel connection-type regular battery as described above but also an internal serial connection-type bipolar battery. Note that, in general, a battery element in a bipolar battery has a configuration in which a plurality of bipolar electrodes and a plurality of electrolyte layers are stacked on top of each other, each bipolar electrode including a negative electrode active material layer formed on one surface of a current collector and a positive electrode active material layer formed on the other surface of the current collector.

The present invention provides the solid solution lithium-containing transition metal oxide containing the compound represented by the chemical formula (1). The use of the solid solution lithium-containing transition metal oxide in the lithium ion secondary battery, can contribute to decreasing the amount of hysteresis and achieving a high discharge capacity.

The invention claimed is:

1. A solid solution lithium-containing transition metal oxide comprising a compound represented by chemical formula (1):

$$Li_{1.5}[Ni_a Co_b Mn_c [Li]_d]O_3 \qquad (1)$$

wherein a, b, c and d satisfy relationships: $0.39 \le a < 0.75$, $0 \le b \le 0.18$, $0 < c < 1.00$, $0.05 \le d \le 0.25$, and $a+b+c+d=1.5$, the oxide having a structure obtained by pretreatment done by repeating a charge and discharge cycle with respect to a counter electrode to gradually increase the upper limit potential, each cycle charging at a rate of 0.1 C until an upper voltage of between 4.3 or greater and less than 4.8 and discharging at the rate of 0.1 C until a minimum voltage is reached, the upper voltage increasing with each cycle.

2. The solid solution lithium-containing transition metal oxide according to claim 1, wherein, in the chemical formula (1), a and d satisfy $0.42 \le a < 0.75$ and $0.05 \le d \le 0.23$ respectively.

3. The solid solution lithium-containing transition metal oxide according to claim 2, wherein, in the chemical formula (1), b satisfies $0 \le b \le 0.11$.

4. The solid solution lithium-containing transition metal oxide according to claim 3, wherein, in the chemical formula (1), a and d satisfy $0.48 \le a < 0.75$ and $0.10 \le d \le 0.23$ respectively.

5. The solid solution lithium-containing transition metal oxide according to claim 4, wherein, in the chemical formula (1), b satisfies $0.02 \le b \le 0.07$.

6. A lithium ion secondary battery comprising the solid solution lithium-containing transition metal oxide according to claim 1.

7. The solid solution lithium-containing transition metal oxide according to claim 1, wherein an amount of hysteresis of a lithium ion secondary battery to which the compound is applied as a positive electrode active material is in a range from 0.1 V to 0.25 V.

8. The solid solution lithium-containing transition metal oxide according to claim 1, wherein the pretreatment includes the following charge and discharge cycles:

a first cycle charged at a rate of 0.1 C until a voltage of 4.45 V is reached and then discharged at the rate of 0.1 C until a voltage of 2.0 V is reached;

a second cycle charged at the rate of 0.1 C until a voltage of 4.55 V is reached and then discharged at the rate of 0.1 C until the voltage of 2.0 V is reached;

a third cycle charged at the rate of 0.1 C until a voltage of 4.65 V is reached and then discharged at the rate of 0.1 C until the voltage of 2.0 V is reached; and a fourth cycle charged at the rate of 0.1 C until a voltage of 4.75 V is reached and then discharged at the rate of 0.1 C until the voltage of 2.0 V is reached.

* * * * *